UNITED STATES PATENT OFFICE.

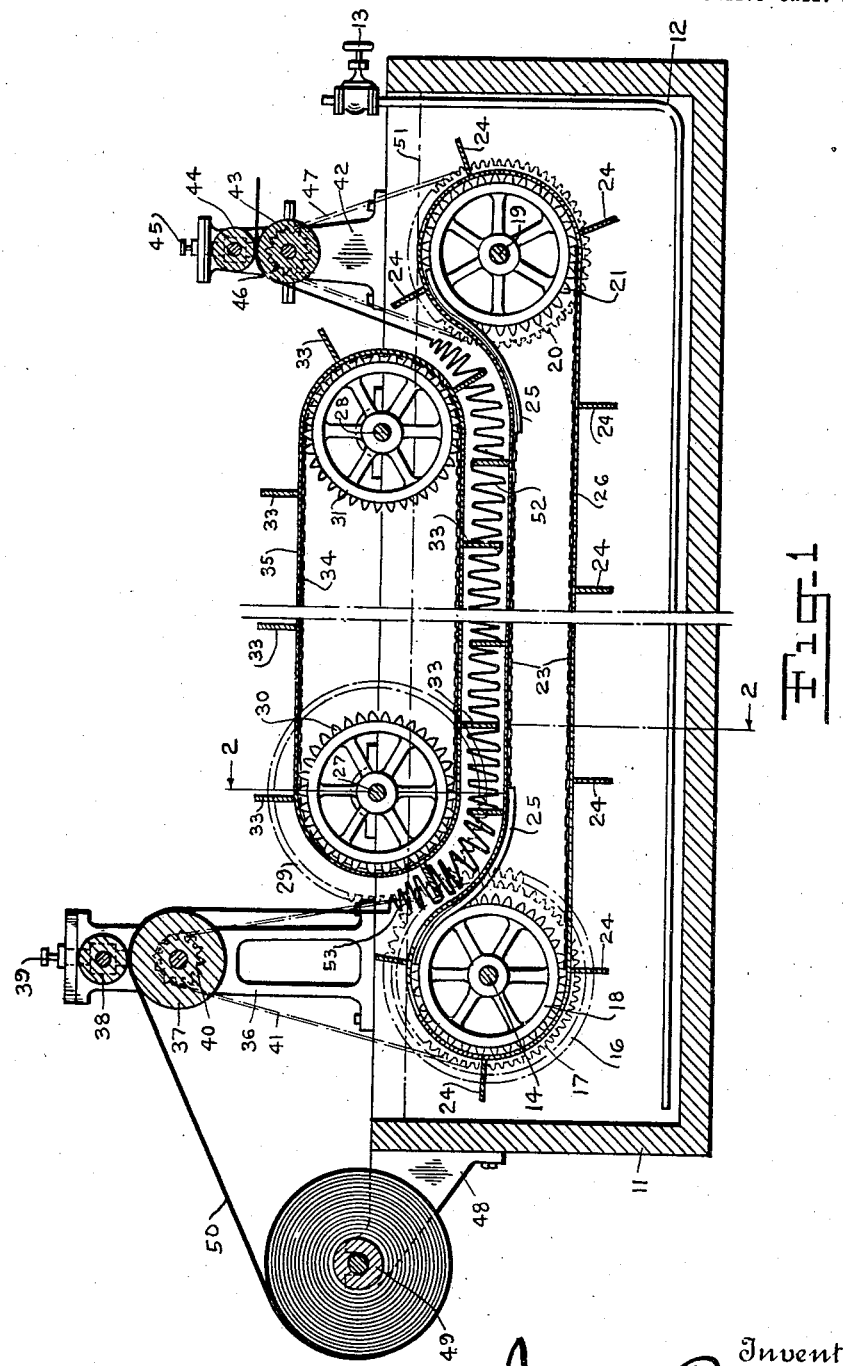

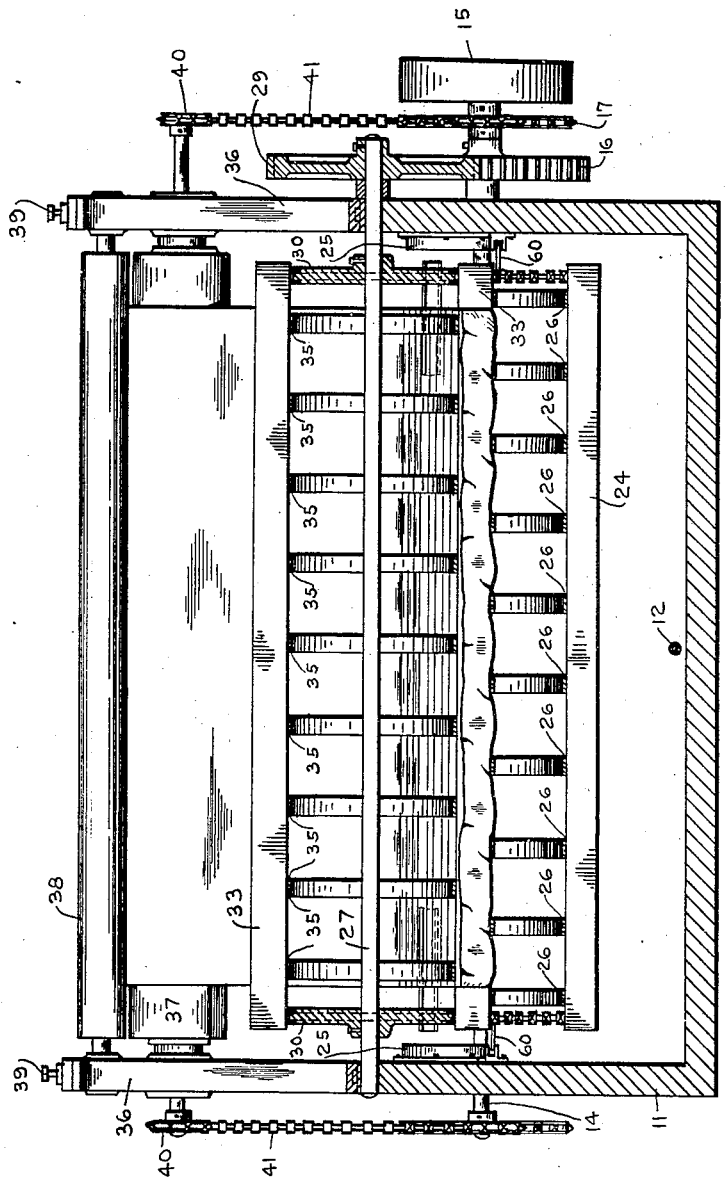

JEROME PAYET, OF CLIFTON, NEW JERSEY.

APPARATUS FOR CLEANING FABRICS.

1,220,268.      Specification of Letters Patent.      Patented Mar. 27, 1917.

Application filed June 17, 1916. Serial No. 104,320.

*To all whom it may concern:*

Be it known that I, JEROME PAYET, a citizen of the United States, and a resident of Clifton, in the county of Passaic, in the State of New Jersey, have invented certain new and useful Improvements in Apparatus for Cleaning Fabrics, of which the following is a specification.

My invention relates to apparatus for treating and cleaning fabrics, as for instance, for the "boiling off" of silk and the like, and has for one of its principal objects to provide such a machine which shall be simple in construction, automatic, efficient, and thorough in its action.

The invention consists in the novel construction, arrangement and combination of various devices, elements and parts, as shown in the accompanying drawings, and fully described in this specification.

In the said drawings, Figure 1 is a longitudinal vertical section of my apparatus, and Fig. 2 is a transverse section thereof taken on the line 2—2 of Fig. 1 looking in the direction of the arrows.

In carrying my invention into effect in the embodiment thereof which I have selected for illustration in the accompanying drawings and description in this specification, I provide a suitable tank or vat 11, adapted to contain heated water or any other solution with which the fabric is to be treated. The liquid in the tank may be heated by means of a steam pipe 12 extending thereinto, which steam pipe is provided with a suitable stop-cock 13.

Extending transversely through the tank, near one end, and projecting from each side is a shaft 14, having rigidly mounted thereon a pulley 15 (see Fig. 2) by means of which the entire mechanism is adapted to be driven. This shaft 14 also carries on the outside of each side of the tank a sprocket gear 17, on the outside of one side of the tank a gear 16, and on the inside of the tank, near each wall thereof, a sprocket gear 18.

Extending transversely of the tank near its other end, and also extending from each side, is a second shaft 19, having external sprockets 20 corresponding to the sprockets 17, and internal sprockets 21, corresponding to the sprockets 18.

Passing around each sprocket 18 and the corresponding sprocket 21 is an endless chain 23, by means of which the sprockets 21 and shaft 19 are driven. These chains are of sufficient length to sag on the upper stretch between the sprockets, as shown on Fig. 1, and the portions thereof near the said sprockets may be supported by fingers 60 which move in grooves in guides 25.

Secured to and extending transversely of the chains 23, connecting the chains on opposite sides of the machine, are bars 24. Secured to these bars 24 are belts 26. The belts 26, chains 23, and bars 24 together form an endless apron adapted to be carried by the sprockets 18 and 21.

Mounted in the upper part of the tank 11 near its ends are shafts 27 and 28. The shaft 27 extends beyond the side of the tank, and carries a gear wheel 29 (see Fig. 2). This gear wheel meshes with the gear 16, and through it the shaft 27 is driven. The shaft 27 is provided with sprockets 30, and the shaft 28 with sprockets 31, analogous to the sprockets 18 and 21 of the shafts 14 and 19. I provide an apron comprising endless chains 34 adapted to engage with sprockets 30 and 31, bars 33 secured to said chains, and belts 35 secured to said bars. This apron, however, differs from that carried by the shafts 14 and 19 in that it contains substantially no slack.

If desired, the shafts 14, 19, 27 and 28, may be provided with pulleys upon which the belt forming parts of the traveling aprons may run, as a further support to said belts.

Mounted on the tank 11 above the shaft 14 are supports 36, in which are journaled rollers 37 and 38. The roller 38 is provided with screws 39, whereby its pressure upon the roller 37 may be regulated at will. The roller 37 is provided at each end with a sprocket 40, by which it is adapted to be driven by chains 41 passing around these sprockets 40 and around the sprockets 17 on the shaft 14. At the other end of the tank I provide similar devices comprising supports 42, rollers 43 and 44, adjusting screws 45, sprockets 46, and chains 47, by means of which the rollers 43 and 44 are adapted to be driven from the sprockets 20 of the shaft 19.

At one end of the tank I provide brackets 48, adapted to support a reel 49, from which may be unrolled the fabric to be treated.

The operation of my invention is as follows:

The fabric, which I have designated 50, being upon the reel 49, is placed in the brackets 48. The end of the fabric is then passed between the rollers 37 and 38, which are adjusted by the screws 39, and then led downward between the two aprons, the projecting bars of which, as will be observed, alternate with each other. The fabric is passed between the aprons by rotating the shaft 14, which drives the lower apron directly by means of the sprockets 18, and the upper apron indirectly by means of the gear 16. While passing between the aprons, the fabric is doubled upon itself, as shown at 52. After passing between the aprons, the fabric is led upward and between the rollers 43 and 44, which are adjusted by the screws 45. The tank is filled with suitable liquid, as indicated at 51, and this liquid may be kept heated by steam in the pipe 12.

The apparatus may then be driven by power applied to the pulley 15. The two aprons move at the same speed, and the two sets of friction rollers move at the same speed, but the speed of the friction rollers is greater than that of the aprons. After the fabric is passed between the rollers 37 and 38, it drops downward upon one of the projections of one of the aprons. As the apron is moving slower than the fabric, the fabric doubles up upon the projection, as shown at 53, and passes through the aprons in this condition, which results in its being immersed in the liquid for a much longer time than would otherwise be the case, and this doubling or folding up of the fabric also provides that there shall be ample slack in the same as it passes through the liquid, thus preventing any possibility of stretching or tearing of the fabric. The projections, provided at intervals on the aprons, prevent the fabric from dragging. As the fabric emerges from between the aprons, it is straightened out by the pull of the rollers 43 and 44, which move at a faster rate than the aprons.

The advantages of my invention will be obvious from what has been above set forth concerning its construction and mode of operation. I do not limit myself to the exact form described, as it is obvious that various modifications may be made, without departing from the spirit and scope of my invention.

Having thus described my invention, what I claim as new and desire to secure by Letters Patent is as follows:

1. In an apparatus for cleaning fabric, the combination with a tank; of a pair of moving aprons therein provided with projections rigidly secured thereto and adapted to engage with a fabric placed between said aprons, and automatic means adapted to feed fabric between said aprons at a rate more rapid than the movement of said aprons.

2. In an apparatus for cleaning fabric, the combination with a tank; of a pair of moving aprons therein provided with projections rigidly secured thereto and adapted to engage with a fabric placed between said aprons, automatic means adapted to feed fabric between said aprons at a rate more rapid than the movement of said aprons, and automatic means adapted to remove fabric from between said aprons at a rate more rapid than the movement of said aprons.

3. In an apparatus for cleaning fabric, the combination with a tank provided with shafts mounted therein, and means adapted to drive the same; of gear wheels mounted on each shaft, a pulley mounted on each shaft intermediate its ends, a moving apron passing around said shafts, said moving apron comprising a sprocket chain adapted to engage with said gear wheels, cross-pieces extending laterally from said sprocket chain, and a belt secured to said cross-pieces and adapted to pass around said pulley; and means adapted to feed fabric upon said apron at a rate more rapid than the movement of said apron.

4. In an apparatus for cleaning fabric, the combination with a tank provided with rotating devices mounted therein, and means adapted to drive the same; of a pair of moving aprons passing around said rotating devices and provided with projections rigidly secured to said aprons and adapted to engage with a fabric passed between said aprons, the upper reach of one of said aprons being permitted to sag, and automatic means adapted to feed fabric between said aprons at a rate more rapid than the movement of said aprons.

5. In an apparatus for cleaning fabric, the combination with a tank provided with rotating devices mounted therein, and means adapted to drive the same; of a pair of moving aprons passing around said rotating devices, the upper reach of one of said aprons being permitted to sag, guides adapted when said apron is in place on said rotating members to cause said sag to occupy the portion of said reach near its ends, and to hold the central portion of said reach approximately horizontal, and means adapted to feed fabric between said aprons at a rate more rapid than the movement of said aprons.

6. In an apparatus for cleaning fabric, the combination with a tank; of a moving apron therein, said moving apron comprising chains, cross-pieces connecting said chains, and a belt connecting said cross-pieces; and means adapted to feed fabric upon said apron.

In witness whereof I have hereunto signed my name this 15th day of June, 1916.

JEROME PAYET.